Nov. 5, 1963   J. R. MACDONALD   3,109,930
ELECTRICAL ANALOGUE FOR DIFFUSION ANALYSIS
Original Filed Oct. 28, 1958   9 Sheets-Sheet 1

INVENTOR
*James Ross Macdonald*

BY *Stevens, Davis, Miller & Mosher*
ATTORNEYS

INVENTOR
James Ross Macdonald

BY
ATTORNEYS

Nov. 5, 1963    J. R. MACDONALD    3,109,930
ELECTRICAL ANALOGUE FOR DIFFUSION ANALYSIS
Original Filed Oct. 28, 1958    9 Sheets-Sheet 3

INVENTOR
James Ross Macdonald

BY *Stevens, Davis, Miller & Mosher*
ATTORNEYS

Nov. 5, 1963    J. R. MACDONALD    3,109,930
ELECTRICAL ANALOGUE FOR DIFFUSION ANALYSIS
Original Filed Oct. 28, 1958                9 Sheets-Sheet 4

INVENTOR
James Ross Macdonald

BY *Stevens, Davis, Miller & Mosher*
ATTORNEYS

Nov. 5, 1963    J. R. MACDONALD    3,109,930
ELECTRICAL ANALOGUE FOR DIFFUSION ANALYSIS
Original Filed Oct. 28, 1958    9 Sheets-Sheet 5

INVENTOR
James Ross Macdonald

BY
ATTORNEYS

INVENTOR
*James Ross Macdonald*

з,109,930
ELECTRICAL ANALOGUE FOR DIFFUSION ANALYSIS
James Ross Macdonald, Dallas, Tex., assignor to Texas Instruments Incorporated, Dallas, Tex., a corporation of Delaware
Continuation of application Ser. No. 770,166, Oct. 28, 1958. This application June 13, 1960, Ser. No. 35,844
12 Claims. (Cl. 235—183)

This is a continuing application wherein the disclosures in my copending applications Serial No. 635,530, now abandoned, filed January 22, 1957, and Serial No. 770,166, now abandoned, filed October 28, 1958, a continuation-in-part application from the application Serial No. 635,530, are combined.

According to the specific example given, the invention comprises an electrical analogue for the analysis of a physical diffusion system. The invention was particularly designed for use in the analysis of tracer distribution volumes in compartmental biological systems. These systems are simulated by a network of resistors and capacitors. Voltage curves from the analogue capacitors can be compared directly with graphically plotted tracer concentration curves to high accuracy. Adjustment of the analogue elements for correspondence between such voltage and concentration curves allows accurate values of diffusion rate constants and tracer volumes of distribution to be rapidly obtained.

The apparatus and method of the invention is applicable where transient flow between volumes or diffusion with differing forward and back rate constants is present.

The instrument according to the present invention was designed to solve rapidly and accurately the problem of diffusion of a tracer substance from one fluid volume in a biological system into as many as four other volumes. As diffusion occurs from the fluid volume into which a known amount of the tracer is initially injected, the tracer concentration in this volume decreases while those of the other fluid volumes increase from zero. At the beginning of an experiment, all the volumes and diffusion rate constants between the volumes are unknown. These quantities must be extracted from measurements of the tracer concentration as a function of time in one or more of the accessible volumes of the system. When the system is linear and the volumes and diffusion rates constant during the experiment, these concentration curves are composed of sums and differences of exponentials. If the volumes and diffusion rates are known, it is a simple matter to calculate the concentration curves. The reverse calculation is a different matter, however, and when three or more separate volumes are involved, it is virtually impossible in practical cases to calculate the system parameters from knowledge of the concentration curves. The present machine, by making use of an electrical analogy of the biological system, eliminates the need for such calculations. In electrical terms, it allows a circuit synthesis to be carried out so that system parameters are obtained from the the transient response of the system to an impulse or step function applied at $t=0$. Although it was built specifically for a medical application, the machine is applicable to diffusion problems occurring in many diverse fields of activity, of which chemical process studies, geophysics, and semiconductor physics may be mentioned.

The specific medical application for which the present instrument was designed is the diffusion of radioactive sulphate, $S^{35}O^4$, injected into the blood of human subjects. Since only a few micrograms of labelled sulphate is thus injected, the normal blood sulphate concentration remains essentially undisturbed. In normal subjects, the tracer rapidly mixes with the blood and diffuses into the rest of the extracellular fluid (ECF) volume (the lymph system, etc.). It is assumed that such mixing occurs in a time short compared with the volume-to-volume diffusion processes. Tracer is also removed from the blood by the kidneys, and eventually appears in the urine. From the extracellular volume, a small amount of tracer diffuses into the cells. In patients with edema and/or ascites, diffusion also occurs from the ECF volume into these additional fluid volumes as well.

The blood plasma compartment of the body represents a fairly well defined single volume. On the other hand, many of the other volumes with which we are concerned, such as the cell volume, represent the sum of a large number of separate elemental volumes. The lumping of such elements into a single "average" volume usually turns out to be an excellent approximation. The volume of a compartment in a tracer experiment is not necessarily its total physical volume but, by definition, is that part of such volume which is accessible to the tracer employed. Thus, at final equilibrium, the magnitude of the compartment as measured by the specific tracer used will be proportional to the amount of labelled material (proportional to counting rate for a radioactive tracer) in the compartment. Strictly speaking, therefore, the volumes with which one is concerned in a tracer experiment should be designated "tracer spaces," e.g., "radio-sulphate space" in the present experiment. In many cases, a tracer material can be found whose corresponding volumes of distribution approximate quite closely to the physical volumes of interest in the biological system.

The above picture, and its corresponding translation to electrical terms, is only correct if it is assumed that uniform concentration of tracer within any compartment is achieved by mixing and internal diffusion in a time short compared to the time required for intercompartmental diffusion. Although this condition is only approximately met in practice in some compartments, the good agreement is often obtained between theory and experiment indicates that this restriction is usually not of paramount importance.

Prior to the applicant's invention, the diffusion between a plurality of fluid volumes in a biological system has been analyzed using an electrical analogue comprising capacitors and resistors to represent the same quantities that they are used to represent in the present invention. But the system according to the present invention is far simpler electrically and cheaper to build than any comparable prior system. The present invention further improves over prior systems by incorporating direct and precise checking of analogue output with experimental data and by utilizing a special analogue circuit for unequal forward and reverse diffusion. This circuit will accurately integrate a current or voltage without appreciable effect on the quantity to be integrated. The analogue circuit of the present invention has a wide dynamic range, a very high input impedance, and will integrate a current through a resistor which may be time-varying or nonlinear. The present invention is directed toward the analysis of transient flow, whereas comparable prior art systems treat only the problem of steady-state flow where the biological or electrical system is continuously excited and the material or charge flowing out of one compartment or capacitor is compensated by a corresponding inflow from the outside. In general, the present invention is simpler, more flexible, and much more precise and accurate than any comparable prior art system.

Further advantages of the present invention will become evident from the description with respect to the drawings, wherein.

Figure 1:
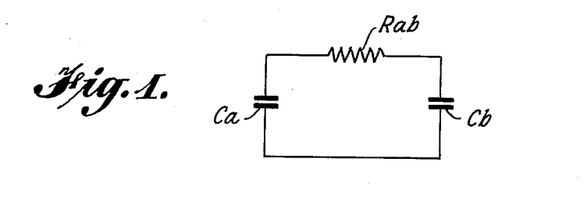
FIGURE 1 shows the circuit which represents the electrical analogy of diffusion between two fluid volumes.

The electrical analogy of diffusion between two volumes $v_a$ and $v_b$ with a diffusion rate constant $k_{ab}$ is a resistor $R_{ab}$ connected between two capacitances $C_a$ and $C_b$ as shown in FIGURE 1. The capacitances $C_a$ and $C_b$ are respectively analogous to the volumes $v_a$ and $v_b$ and the inverse of the resistor $R_{ab}$ ($1/R_{ab}$) is analogous to the diffusion constant $k_{ab}$. The details of the analogy are readily derived from the corresponding differential equations, which are as follows for diffusion between two fluid volumes $v_a$ and $v_b$.

$$\frac{dm_a}{dt} \equiv v_a \frac{dc_a}{dt} = -\rho_{ab}(c_a - c_b)$$

$$\frac{dm_b}{dt} \equiv v_b \frac{dc_b}{dt} = -\rho_{ab}(c_b - c_a)$$

(1)

The quantities $m_a$ and $m_b$ are respectively the tracer masses in the volumes $v_a$ and $v_b$, and the quantities $c_a$ and $c_b$ are respectively the tracer concentrations in the volumes $v_a$ and $v_b$. The differential equations for the corresponding electrical circuit shown in FIGURE 1 are as follows:

$$\frac{dQ_a}{dT} \equiv C_a \frac{dV_a}{dT} = \frac{-1}{R_{ab}}(V_a - V_b)$$

$$\frac{dQ_b}{dT} \equiv C_b \frac{dV_b}{dT} = \frac{-1}{R_{ab}}(V_b - V_a)$$

(2)

$Q_a$ and $Q_b$ are respectively the charges on capacitors $C_a$ and $C_b$ while $V_a$ and $V_b$ are respectively the voltages on capacitors $C_a$ and $C_b$.

Comparison of the two sets of equations allows us to write the following transformation equations. Below each equation, the units we shall use are also shown.

$$[\text{kilocounts/min}] \quad \begin{matrix} m = \delta Q \\ =[\delta] \end{matrix} \quad [\mu\text{coulombs}]$$

$$[\text{hours}] \quad \begin{matrix} t = \epsilon T \\ =[\epsilon] \end{matrix} \quad [\text{seconds}]$$

$$[\text{liters}] \quad \begin{matrix} v = (\delta/\lambda)C \\ =[\delta/\lambda] \end{matrix} \quad [\mu\text{farads}]$$

$$[\text{counts/min.-c.c.}] \quad \begin{matrix} c = \lambda V \\ =[\lambda] \end{matrix} \quad [\text{volts}]$$

$$[\text{liters/hr.}] \quad \begin{matrix} k = (\delta/\epsilon\lambda)R^{-1} \\ =[\delta/\epsilon\lambda] \end{matrix} \quad [\text{megohms}]^{-1}$$

(3)

The conversion factors, denoted by Greek letters, are chosen so that the relations $m = vc$, $Q = CV$, and $v/k = \epsilon RC$ hold as they should.

The results of a biological experiment are the initial tracer charge, $m_0$, and one or more curves of concentration versus time. The essence of the use of an electrical analogue for analyzing such curves is to derive from it voltages $V(T)$ which can, in some fashion, be compared with the experimental concentration curves. Then, the analogue elements, applied voltage, capacitances, and resistances are adjusted until $V(T)$ versus $T$ is of the same form as one of the concentration curves. The conversion factors may then be evaluated and used in conjunction with the final values of the electrical parameters to yield the desired volumes and rate constants of the biological system which led to the experimental curves. Since different concentration curves may often be obtained from concurrent measurements in two or more separate volumes of the biological system, while analysis of the system can often be carried out with only one such curve, a valuable internal check of the correctness of the assumed biological model is available. When only one curve is used to obtain the system interconnection and parameters, the output of the analogue may be then switched to yield a voltage proportional to the concentration in another volume, and this curve then checked against the experimental result for this volume. Good agreement indicates that the model and parameter choice obtained from the analogue are good approximations for the actual system.

In the present machine, accurate comparison between the cycled output of the electrical analogue and the biological experimental data is carried out by using a graph on which are plotted the experimental concentration curves. The analogue output appears on the graph as a light spot swept across the graph in the $+x$ direction once each cycle. The spot is derived from a fast-acting galvanometer, and is used to plot out the analogue output on the graph. High accuracy is achieved with this comparison method, and the analogue elements may be rapidly adjusted to make the spot follow a given experimental curve over its entire length.

Figure 2A:
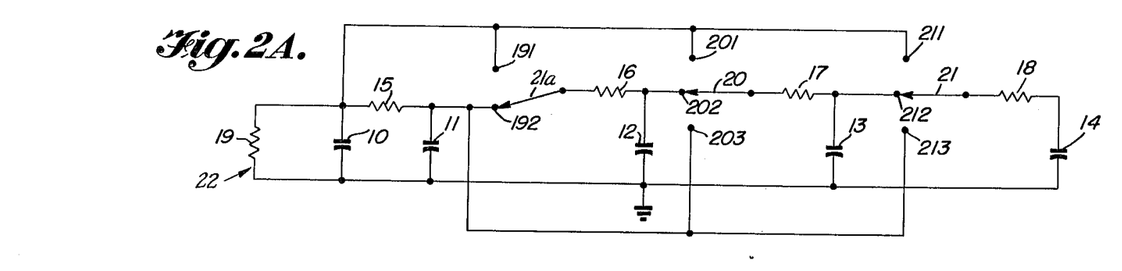
FIGURES 2A, 2B, 2C and 2D illustrate the electrical analogy of diffusion between several fluid volumes as used in the present invention.
Figure 2B:
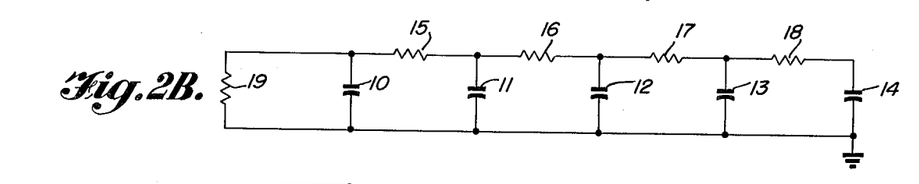
Figure 2C:
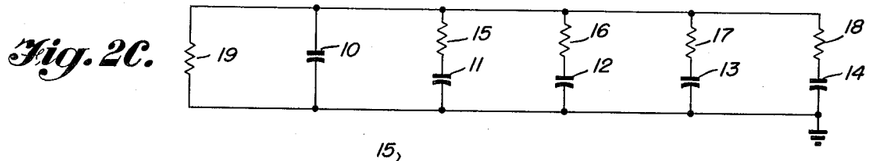
Figure 2D:
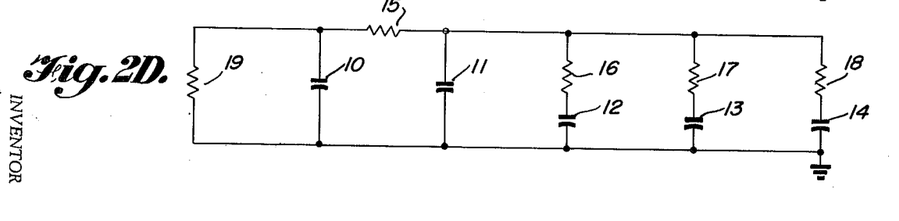

In FIGURE 2A is shown an analogue circuit, designated generally by the numeral 22, employed in this invention. In this circuit, the capacitors 10 through 14 are respectively analogous to fluid volumes, while resistors 15 through 19, when inverted, are analogous to diffusion constants. By means of the switches 20, 21, and 21a, altogether six distinguishable analogue circuits may be obtained representing six different fluid volume systems. The three most important circuits are shown in FIGURES 2B, 2C, and 2D. With the switch 21a engaging contact 192 and with the switches 20 and 21 engaging the contacts 202 and 212 respectively, the circuit shown in FIGURE 2B is obtained. With the switch 21a engaging contact 191 and the switches 20 and 21 respectively engaging the contacts 201 and 211, the circuit shown in FIGURE 2C is obtained. With the switch 21a in position engaging contact 192 and the switches 20 and 21 engaging contacts 203 and 213 respectively, the circuit shown in FIGURE 2D is obtained. Each of the circuits in FIGURES 2B, 2C and 2D represent a different diffusion system. The circuit shown in FIGURE 2B represents a fluid system in which there is diffusion between the fluid volume represented by the capacitor 10 and the fluid volume represented by the capacitor 11 and between that fluid volume and a third fluid volume which is represented by the capacitor 12. There is diffusion between the third fluid volume and a fourth fluid volume represented by the capacitor 13 and finally between the fourth fluid volume and a fifth fluid volume represented by the capacitor 14. In the circuit shown in FIGURE 2C, there is represented a system in which there is diffusion between one fluid volume represented by the capacitor 10 and four other fluid volumes respectively represented by the capacitors 11 through 14. In the fluid system represented by the circuit in FIGURE 2D, there is diffusion between two fluid volumes represented respectively by capacitors 10 and 11 and diffusion between the fluid volume represented by the capacitor 11 and three other fluid volumes represented respectively by the capacitors 12, 13 and 14. This particular circuit represents that fluid system which experimental evidence shows is the biological system when edema and/or ascites are present. The initial amount of radio-active tracer is usually injected into the blood and corresponds to an initial charge on what would be the blood capacitor 10. Some of the tracer flows out with the urine. This process is represented by the resistor 19. In addition, equilibrium between the tracer in the blood and that in the remaining part of the ECF volume, represented by capacitor 11, is rapidly attained. Also, tracer diffuses from the ECF represented by the capacitor 11 more slowly into the other volumes of the system: the cell volume, the edema volume, and the ascites volume, represented respectively by capacitances 14, 13, and 12.

In the operation of the invention, one capacitor is selected and is repeatedly charged and allowed to discharge into the remaining capacitors over a continuous cycle. The remaining capacitors cyclically are simultaneously shorted out with the charging of capacitor 10 so that, at the beginning of each discharge phase, there is a full charge on the selected capacitor and there is no charge on the remaining capacitors. The selected capacitor after it is charged discharges through the various resistors into the remaining capacitors, and the charge on these capacitors gradually builds up while the charge on the selected capacitor decreases. The capacitor 10 also discharges through the resistor 19. The selected capacitor is then again charged in the next cycle to the same initial value, and the remaining capacitors are again shorted out, and the cycle is continuously repeated. This operation results in a repetition of the voltage waveforms on the various capacitors which, therefore, can be more easily observed. The voltage initially applied to the selected capacitor represents the initial concentration of the tracer injected into the first fluid volume, and the voltages on the remaining capacitors represent the buildup of this concentration in the remaining fluid volumes as the initial injected fluid diffuses from the initial fluid volume.

If the repeating voltage curve on one of the capacitors is made to conform with the curve obtained experimentally from the concentrations in the actual fluid volume system, then the actual quantities such as the effective fluid volume and the diffusion constants can be determined by simply multiplying the values of the capacitors and resistors by the conversion factors explained above. The voltage curve on the selected capacitors is made to conform to the experimental curve by varying the various capacitances and resistances, and by varying the initial charge on the capacitor 10 until a good correspondence is obtained. It is necessary, therefore, that each of the resistors and capacitors be variable. Accordingly, the capacitors are each made up of mylar or polystyrene dielectric decades covering a range from 11.11 micro-farads to 0.001 micro-farad. The resistors are each three-decade plug-in units, and have maximum values ranging in steps of ten from 9.99 megohms to 9.99 kilohms.

After the capacitors, resistors, and charging voltage are correctly adjusted to produce a voltage curve on one of the capacitors which coincides with the curve obtained experimentally from the concentration of the tracer in the corresponding fluid volume, the accuracy of the adjustments can be checked by comparing the resulting voltage curve on a second capacitor with the tracer concentration curve obtained experimentally from the fluid volume corresponding to the second capacitor.

Figure 3:
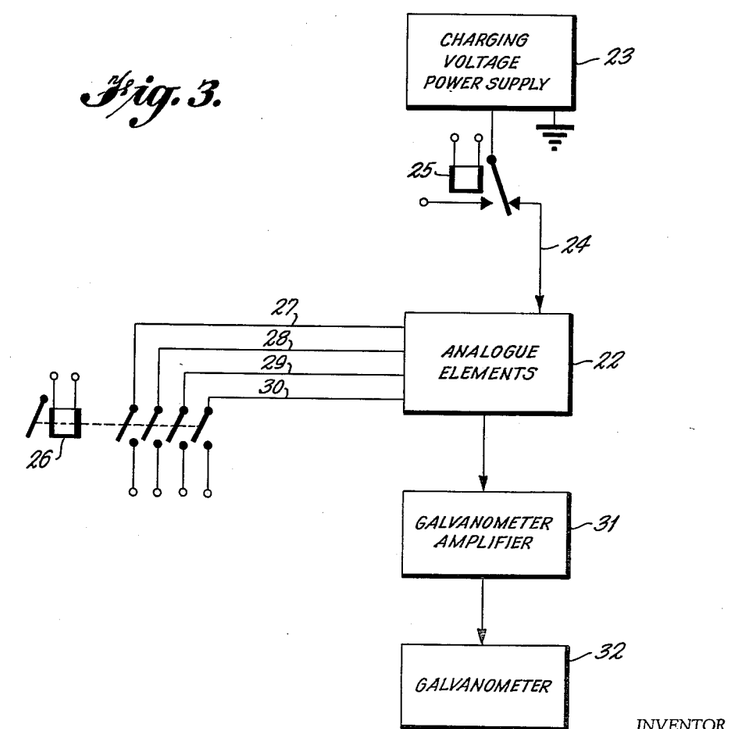
FIGURE 3 illustrates a block diagram showing overall organization of the apparatus.

A block diagram showing the over-all organization of the apparatus used in the invention is shown in FIGURE 3. An accurately-known capacitor charging voltage is derived from the charging voltage supply 23, and is applied periodically to a selected one of the capacitors in the analogue circuit 22 through line 24. The charging voltage supply comprises a highly stabilized voltage source and a ten-turn precision potentiometer, such as is sold under the tradename "Helipot." This circuit will be described in more detail below. The periodic charging cycle is designed to be 1.5 seconds with the charging voltage being applied for 0.5 second. The remaining capacitors of the analogue circuit 22 are shorted during each cycle by lines 27 through 30 simultaneously with the charging of the selected capacitor for the entire 0.5 second charging period. During the remaining one second interval of each cycle, the charged capacitor discharges into the remaining capacitors. As a result of the shorting of the remaining capacitors during the charging phase of the cycle, these capacitors initially have no charge at the beginning of the one second discharge phase of the cycle. The relays 25 and 26 control respectively the charging of the selected capacitor and the shorting of the remaining capacitors. These relays are de-energized rather than energized to close their respective circuits during the 0.5 second charging phase of the cycle so that they will be energized rather than de-energized at the beginning of the one second discharge phase of the cycle. The circuit is designed in this manner so that the initiation of the discharge phase can be brought about precisely at the same time during each cycle. The voltage on any one of the capacitors in the analogue circuit can be analyzed by applying it to a galvanometer amplifier 31 which applies an output current to the visual galvanometer 32. Since the voltage curves of the capacitors are repeating curves, the galvanometer 32 gives a continuous visual representation of the output voltage of the capacitor under analysis.

Figure 4:
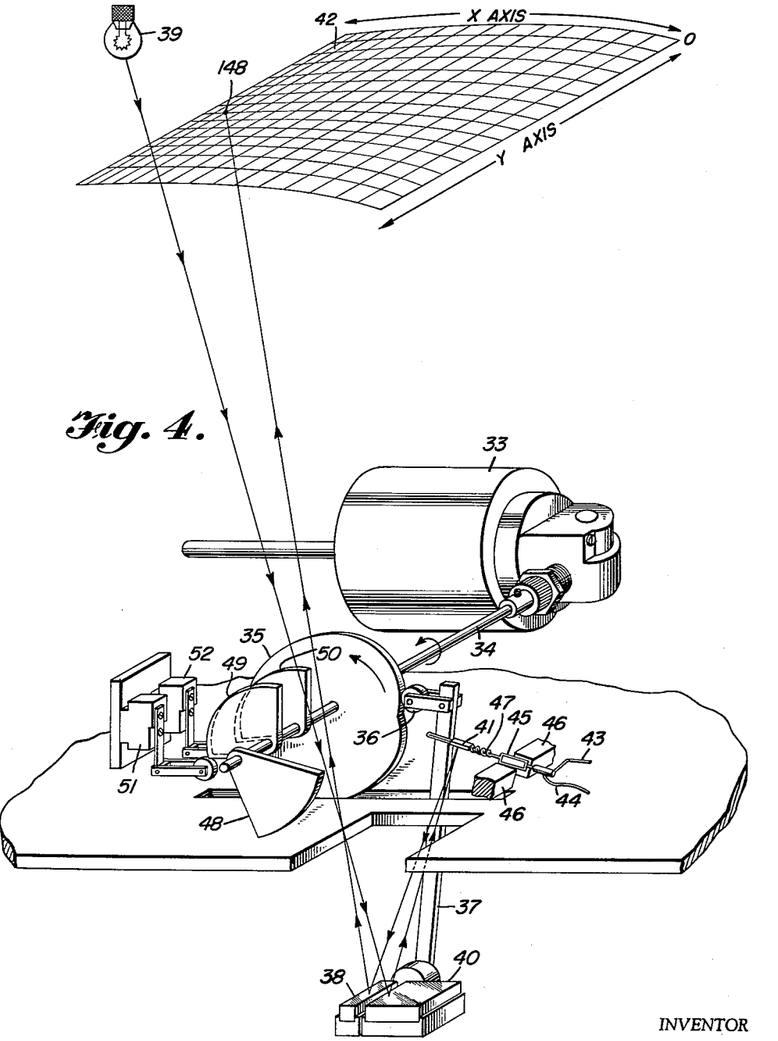
FIGURE 4 illustrates the operation of the visual galvanometer of the instrument.

The operation of visual galvanometer 32 is illustrated in FIGURE 4. A light spot 148 is focused by a curved mirror 41 on a piece of graph paper upon which the experimental curves have been plotted. The Y axis deflection of the spot is caused by the deflection of the curved mirror under the control of the signal input to the winding of the armature 45 of the galvanometer. The Y axis deflection of the spot will be proportional to the voltage on the capacitor of the analogue elements selected for study as it is this signal voltage which is amplified and applied to the coil of the armature 45. In addition to the Y axis deflection, there is an X axis sweep so adjusted that the spot traverses the entire marked long axis of the graph paper in exactly one second. The X axis sweep is derived from the sweep mirror 38, which is tilted cyclically by a cam system. A hysteresis synchronous motor 33, through reduction gearing, drives a shaft 34 at 40 r.p.m. The shaft drives a sweep cam 35. The cam 35 engages a roller 36 which is attached to an arm 37. Fixed to the arm 37 is the sweep mirror 41. As the sweep cam 35 rotates as driven by the synchronous motor 33, it causes the arm 37 to move gradually to the left for exactly one second and then retrace rapidly to the right for ½ second; and then gradually to the left again upon the next revolution of the cam 35, the motion being cyclically repeated. Since the mirror 38 is fixed to the arm 37, it has the same motion and causes the light spot to sweep to the left for one second. The retrace is blocked out, as will be explained below. The light spot is produced by means of the light source 39, which impinges a light beam on the fixed mirror 40, which reflects the beam to the curved mirror 41. The curved mirror 41 reflects the beam to the mirror 38 and, after reflection thereby, focuses the beam on the screen 42.

As a result of the motion of the arm 37, the light spot 148 applied to the screen 42 sweeps across the screen from right to left cyclically with a period of 1.5 seconds, the time of the sweep being exactly one second. The sweep cam is accurately cut so that the sweep is highly linear. The output of the galvanometer amplifier 31 (see FIGURE 3) is applied to the visual galvanometer over the lines 43 and 44. This output voltage is applied to the winding of the armature 45 which is positioned between the poles 46 of a permanent magnet. When the voltage is applied to the winding, the armature is caused to rotate by the magnetic field set up by the poles 46. This rotation causes a like rotation of the curved mirror 41 through the spring 47. The rotation of the mirror 41 results in a displacement of the light spot 148 on the screen 42 in the Y axis direction. The light spot 148 will therefore trace a line on the screen 42 which represents the output voltage of the galvanometer amplifier 37 as a function of time. The rotation of the cam 35 supplies the sweep while the rotation of the armature 45 supplies the amplitude of the function.

A cam 48 is also rotated by the shaft 34 and blanks out the retrace of the light spot 148 on the screen 42. The cam 48 is rotated in position to block the beam of light reflected from the mirror 38 when the light spot is being retraced by the rotation of the sweep mirror from right to left. Also during the retrace period, two cams 49 and 50 engage rollers which cooperate with microswitches 51 and 52, respectively. These cams are driven by the shaft 34. When the cams 49 and 50 engage their respective rollers, the microswitches 51 and 52 are opened, de-energizing the relays 26 and 25, respectively. (See FIGURE 3.)

The cams 49 and 50 are positioned to engage the rollers of microswitches 51 and 52 during the 0.5 second retrace period. Therefore, these switches are open during this period, and the control relays 25 and 26 are de-energized during this period. Accordingly, the relays 25 and 26, respectively, connect the charging supply to the capacitor selected for charging and short-out of the remaining capacitors during the retrace period. Thus, by correctly positioning the cams 25 and 26, the charging and discharging of the analogue circuit is synchronized with the sweep of the light spot 148, and the retrace period is made to coincide with the charging phase, and the sweep period is made to coincide with the discharge phase. The beginning of the period when the charged capacitor begins to discharge is made to coincide exactly at the time that the galvanometer spot in its sweep from right to left reaches the marked portion of the graph paper 42, that is, where it reaches the abscissa where $X=0$. This is done by positioning the cam 50 so that it disengages the roller of the microswitch 52 exactly at this time to thereby cause the energization of the relay 25 and the disconnection of charging voltage from capacitor 10 exactly at this time. Similarly, the shorting circuit on the remaining capacitors in the analogue circuit is disconnected at this exact time.

The graph paper 42 containing the experimental curve is semitransparent, and is mounted by clamping it at the corners over a transparent plastic surface, curved along the X axis to reduce optical errors. The figure shows the graph paper viewed from above.

The galvanometer amplifier 31, which amplifies the output signal taken from the selected capacitor and applies it to the visual galvanometer, comprises a circuit which is designed to give a current output which is accurately proportional to the input voltage, and which has a very high input impedance. The circuit of this amplifier is shown in detail in FIGURE 5. In this circuit, both negative and positive feedback are used, and the amplifier has a flat response to over 10,000 cycles per second. The input to the amplifier is supplied between terminals 53 and 54. Terminal 53 is connected directly to the grid of the left side of double tube 55. The inverted output from the plate of the left side of tube 55 is applied to the grid of the left side of double tube 56. The left side of tube 56 reinverts the signal, and the output on the plate is applied to the grid of the triode 57 through resistors 58 and 59 which attenuate the applied signal. The output is taken from the cathode of tube 57 and applied to the galvanometer input from output terminal 60. The other output terminal 61 is grounded. The output voltage applied to the terminal 60 is also fed back and applied to the grid of the right side of the double tube 55. The voltage which appears on the plate of the tube 55 is an inverted function of the difference of the output voltage between terminals 60 and 61 and the input voltage applied between terminals 53 and 54, as the cathode voltage of the right side of tube 55 depends upon the input voltage, and this will reduce the signal voltage between the grid and cathode applied to the right side of the tube 55. The voltage taken from the plate of the right side of tube 55 is applied to the grid to the right side of the tube 56. This voltage is also applied to the grid of the tube 57 through attenuating resistors 64 and 65. Since this difference voltage is inverted, it tends to reduce the applied signal to the grid of the tube 57 and constitutes a negative feedback. The signal applied to the grid of the right side of tube 56 results in a signal being applied to the cathode of the left side of the tube 56. As is obvious, this signal follows the plate voltage of the right side of tube 55 and, therefore, is a function of the difference between the input and output voltage of the amplifier. This signal increases the grid cathode voltage of the left side of the tube 56, and constitutes a positive feedback to the resulting signal at the plate of the left side of the tube 56. This circuitry will give a highly linear current output from the terminal 60 proportional to the input voltage applied to terminal 53.

Figure 5:
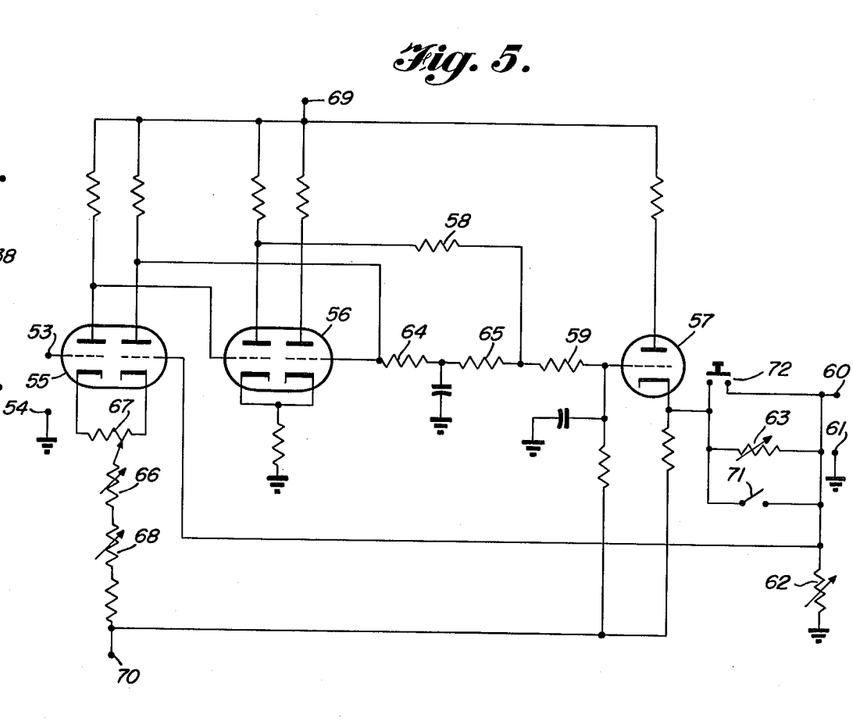
FIGURE 5 shows a circuit diagram for the galvanometer amplifier for producing a linear current output to be applied to the visual galvanometer.

The resistors 67 and 68 in the cathode circuits of the tube 55 are adjustable, and are connected to the adjustable tap on resistor 67 which is connected between the cathodes of the double tube 55. By the proper adjustment of these resistors, the input grid potential when floating disconnected can be adjusted to be exactly ground potential. Such an adjustment results in an input impedance of infinity for incremental grid signals around ground potential and a very high input impedance for larger voltage swings. For example, if a 12BZ7 tube is used for the input tube for voltage swings as large as 10 volts, the input impedance is still more than 500 megohms, and is greater than 1000 megohms for a 5 volt swing. This adjustment in the cathode circuit of the tube 55 is called a floating point adjustment. With an input impedance which is this high, the voltage across a capacitance taken from the analogue circuit is left essentially unchanged by connection of the amplifier input to the capacitance. The stability of the floating point can be improved by adjusting the heater voltage of the amplifier. Power is applied to the tubes 55, 56, and 57 between terminals 69 and 70. A variable 500 ohm resistor 63 is provided in the output circuit from the tube 57, and constitutes a sensitivity adjustment. This resistor also provides damping for the visual galvanometer. With 500 ohms damping, the galvanometer will be somewhat underdamped, but overshoot is still not noticeable. The resistor 63 can be shorted out either by the switch 71 or the push button switch 72 in addition to being adjusted.

Another sensitivity adjustment is afforded by the "scale" precision potentiometer 62. This adjustment controls the magnitude of the total current which passes through the galvanometer and its damping resistor for a given input voltage. It is found that with 500 ohms damping, the sensitivity of the system is such that, for any applied voltage from 10 to 0.1 volts, more than seven times greater current may be applied to the galvanometer than is required to displace the spot the full length of the Y axis on the graph. When the sensitivity is further increased by decreasing the scale resistance 62 even more, the linear relation between input voltage and output current suddenly fails as the amplifier is called on to deliver more current than it is capable of.

Figure 6:
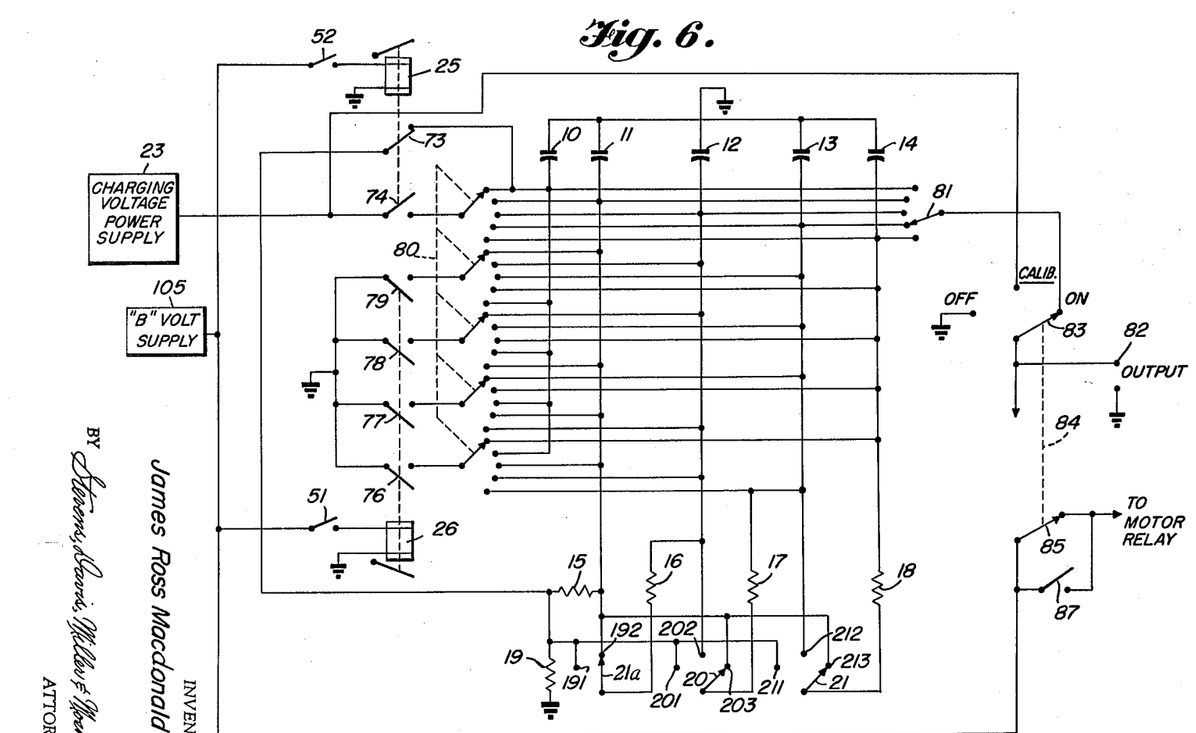
FIGURE 6 illustrates a circuit showing in detail the cooperation between the analogue circuit and the rest of the apparatus.

FIGURE 6 shows in detail how the analogue circuit cooperates with the shorting relay, the charging relay, and output circuit. The microswitch 52, which is actuated by the cam 50 (FIGURE 3), controls the charging relay 25. When the cam 50 engages the roller of the microswitch 52, the switch 52 opens, de-energizing the relay 25 by disconnecting it from the 6 volt relay power supply 105. This causes the relay 25 to release its contact 74. The release of contact 74 closes a circuit from the capacitor 10 to a charging source 23. At the same time that the microswitch 52 is opened, the microswitch 51 is opened by its respective cam, de-energizing the relay 26 and releasing the contacts 76 through 79. The contacts 76 through 79 are connected respectively to the remaining capacitors 11 through 14 and, when they are released, they close a circuit from these capacitors to ground, shorting out these capacitors. After 0.5 second, the cams disengage the microswitches, allowing them to close, and the relays 25 and 26 are simultaneously energized, and the discharge cycle begins wherein capacitor 10 discharges into the remaining capacitor 11 through 14. The contact 74 and the contacts 76 through 79 of relay 26 are respectively connected to the capacitors 10 through 14 over a ganged switch 80 which has five separate positions. The switch, as shown, is in the first position, and connects the charging source 23 to the capacitor 10, as described, and the relay switches 76 through 79 of relay 26 to the capacitors 14 through 11, respectively, so that when the relay switches 76 through 79 are closed, they short-out the capacitors 14 through 11.

By moving the gang switch to any one of its other four positions, a different capacitor will be charged from the source 23 and the remaining capacitors will be shorted out by the relay switches 76 through 79. By placing the gang switch 80 in its separate positions, any one of the capacitors 10 through 14 may become the charging capacitor, and the remaining capacitors will be the capacitors receiving the discharge from the charged capacitor. This provision is made because the tracer is not always injected into the blood stream. The resistances 15, 16, 17, 18 and 19 are the resistances which correspond to the diffusion constant, and are the same as are described with reference to FIGURES 2A to 2D. The different positions of the switches 20, 21, and 21a have already been described with reference to FIGURES 2A through 2D. The voltage for any one of the capacitors can be applied to the output by means of the signal selection switch 81. The output from the switch 81 is applied to the output terminal 82 over the wiper 83 of the function switch 84 when the function switch is in the "On" position, as shown. The output terminal 82 is connected to the input of the galvanometer amplifier, namely to terminal 53 (FIGURE 5). Ganged with the wiper 83 is an additional wiper 85 which applies a voltage of 6 volts from the 6 volt supply 105 to the motor relay when the switch 84 is in the "On" position. As a result, the motor 33 is energized, and rotates the shaft 34. The other positions of the function switch 84 are the "Off" and calibrate positions. In the "Off" position, the wiper 83 connects the output terminal 82 to ground, thus grounding the input to the galvanometer amplifier. When the wiper 83 is in this position, there is no voltage applied to the motor relay so that the motor is turned off. In the calibrating position of the function switch, the charging voltage 23 is applied to the output to provide a calibration voltage for the galvanometer. A separate switch 87 may be used to energize the motor relay to cause operation of the motor when the function switch 84 is not in the "On" position.

Contact 73 of the relay 25 disconnects the capacitor 10 from the resistance 15 during the charging phase of each cycle. This opening of the contact 73 is necessary because otherwise the resistor 15 would connect capacitors 10 and 11 at all times. During the charging phase, one or the other of these capacitors may be being charged while the other is shorted to ground. Without this disconnection, resistance 15 would bridge the voltage source 23 to ground. Since the resistance of the resistor 15 may be as small as a few thousand ohms, the resulting current might change the value of the charging voltage appreciably during the charging phase.

To operate the machine, the graph paper on which the experimental curves are plotted is positioned in the machine so that the cycle begins at $X=0$, and so that the spot follows the X axis with zero-applied voltage. Then, analogue elements and applied voltage are adjusted until the spot follows one of the curves as closely as possible over its entire length. Finally, for checking purposes, the amplifier input may be switched to another of the analogue capacitors corresponding to one of the additional experimental curves on the graph, and the degree of fit observed between the spot motion and the selected curve.

In spite of the absence of spot persistence in the system, it is a simple matter to adjust the analogue elements to achieve correspondence between experiment and analogue. Further, the analogue output can be taken from one of the capacitors which represents an inaccessible volume in the biological system, such as the cell volume. Hence, valuable information is obtained concerning concentration changes in such volumes. Finally, after analogue adjustment, the paths of the spot for all the different capacitances can be accurately drawn on the graph in a very short time, yielding a permanent record of the concentration curves for all the volumes of the system. Alternatively, a permanent record can be obtained using photographic paper in place of the graph paper.

The accuracy of the analysis may be increased by using more than one concentration curve. This is done by first adjusting the circuit parameters so that a fit is obtained between one of the experimental curves and the galvanometer curve; making a comparison between the second experimental curve and the corresponding galvanometer curve and further adjusting the circuit parameters to obtain a closer fit; and continuing the process for each experimental curve available until a close fit between all the experimental curves and the corresponding galvanometer curves is obtained. This result can usually be achieved by just making the comparison and adjustment once for each curve, and it will not be necessary to repeat the process.

Figure 7:
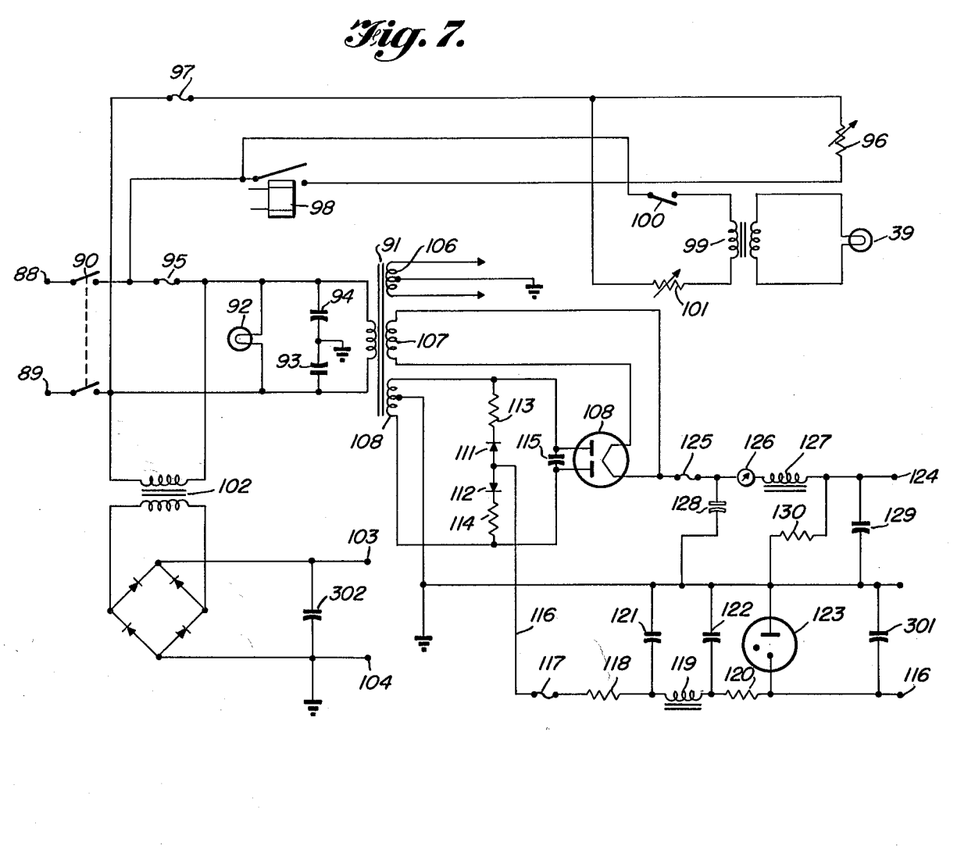
FIGURE 7 illustrates the circuit diagram of the power supply for the motor, the supply relays, the vacuum tube heaters, and the plate voltage for the galvanometer amplifier.

The circuit shown in FIGURE 7 illustrates the power supply portion of the apparatus. The circuit is to be used in conjunction with 115 v., 60 cycle A.-C. power, which is applied at terminals 88 and 89. An Off-On switch 90 connects the 60 cycle power to a Sola transformer 91 which is used to stabilize the tube heater and D.-C. voltages against line voltage changes. A two ampere fuse 95 is connected between the source of power applied to terminals 88 and 89 and the primary winding of the transformer 91. A pilot light 92 is connected across the primary winding and two capacitors 93 and 94 are connected to ground across the primary winding of the transformer 91 for filtering purposes. The Off-On switch 90 also connects the power applied to terminals 88 and 89 to the winding 96 of the sweep motor 33 illustrated in FIGURE 4. A two ampere slow-acting fuse 97 is connected in the motor winding circuit, as is the relay contact of relay 98 which controls the energization of the sweep motor. The Off-On switch 90 also connects the power applied to the terminals 88 and 89 to a step-down transformer 99 over a switch 100 through the fuse 97. The secondary of this transformer is connected to the lamp 39, which is illustrated in FIGURE 3 and provides the light source for the galvanometer. The transformer 99 steps the voltage down to 5 volts. Also connected in the primary circuit of the transformer 99 is a variable resistor 101, which is used to vary the intensity of the lamp 39 by varying the voltage applied to the primary of the transformer 99. The Off-On switch 90 moreover connects the power applied to terminals 88 and 89 to an additional step-down transformer 102 through the fuse 95. The secondary of the transformer 102 is connected to a full-wave rectifier whose output is filtered and provides at terminals 103 and 104 the six-volt relay supply. A filtering capacitor 302 is connected between the terminals 103 and 104. This voltage is indicated generally in FIGURE 6 by the reference numeral 105. The secondary 106 of the transformer 91 provides a 6.3 volt, 2.5 ampere source of power for the tube heaters. The secondary 107 provides a power source to heat the cathode of the rectifier tube 108. A third secondary 109 of the transformer 91 has a grounded center tape, and the terminals of the winding are connected to two respective plates of the rectifier tube 108, and are also connected together to a lead 110 through the respective rectifiers 111 and 112, and the respective resistors 113 and 114. This circuit provides a full-wave rectified output. A capacitor 115 is connected between the two plates of the rectifier tube 108 for filtering purposes. The output on lead 110 is connected to an output terminal 116 through the fuse 117, the resistor 118, the inductance 119, and the second resistor 120. The inductance 119, together with the capacitors 121 and 122, filter the D.-C. output on lead 110, and the attenuating resistance, together with the gas diode 123 which is connected from the terminal 116 to ground, constitutes a voltage regulator so that a constant voltage of −105 volts is obtained from the terminal 116. The capacitor 301 provides further filtering of the voltage from terminal 116. The cathode of the tube 108 is connected to the output terminal 124 through the fuse 125, the milliammeter 126, and the inductance 127. A capacitor 128 is connected from between the fuse 125 and the milliammeter 126 to ground, and a second capacitor 129 is connected from the terminal 124 to ground. The capacitors 128 and 129, together with the inductance 127, constitute a filter to provide a filtered output of 280 volts at the terminal 124. Resistance 130 is connected from the terminal 124 to ground to prevent high voltage isolation of the terminal 124 from ground. The terminal 124 is connected to the terminal 69, and the terminal 116 is connected to the terminal 70 to provide the supply voltage for the galvanometer amplifier 31 shown in FIGURE 5.

Figure 8:
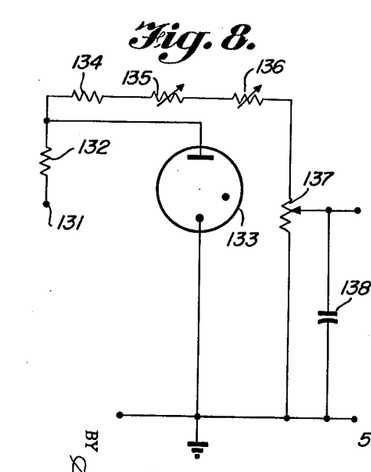
FIGURE 8 illustrates the circuit for the power supply used to cyclically charge a selected one of the capacitors during operation of the apparatus.

The circuit details of how the charging voltage power supply 23 (FIGURES 3 and 6) is derived is shown in FIGURE 8. The 280 volts from terminal 124 is connected to the input terminal 131. This input voltage is attenuated through resistor 132 and then applied to the plate of the gas tube 133. The cathode of the gas tube 133 is connected to ground. The plate of the tube 133 is connected to a ten-turn precision potentiometer 137 through attenuating resistor 134 and the two series variable resistors 135 and 136. The charging voltage is taken from the wiper of the potentiometer 137, and a filtering capacitor 138 connects the wiper to ground. The two series variable resistors 135 and 136 are adjusted to make the voltage across the potentiometer 137 exactly 10 volts. Such adjustment should be made whenever the gas tube 133 is replaced, and during the adjustment, a precision voltmeter should be used having input impedance of 1 megohm or greater. Accuracy of adjustment is necessary here because the accuracy with which charging voltage is known enters directly into the final accuracy of the machine.

Transient flow from one volume to another is a limiting case of diffusion between two volumes in which the forward diffusion rate $k_{ab}$ differs from the reverse rate $k_{ba}$. Such differences can arise physically from the presence of semi-permeable membranes, chemical reactions involving the tracer in one volume and not the other, etc. In the case of transient flow, either $k_{ab}$ or $k_{ba}$ will be zero, depending upon the direction of flow.

The transient diffusion with unequal forward and reverse rates is of considerable importance in many biological systems. When $k_{ab} \neq k_{ba}$ the mechanical differential equations governing mass transfer between two volumes $v_a$ and $v_b$ are:

$$\frac{dm_a}{dt} = v_a \frac{dc_a}{dt} = -k_{ab}m_a + k_{ba}m_b = -\rho_{ab}c_a + \rho_{ba}c_b$$

$$\frac{dm_b}{dt} = v_b \frac{dc_b}{dt} = +k_{ab}m_a - k_{ba}m_a = \rho_{ab}c_a - \rho_{ba}c_b$$

Figure 9:
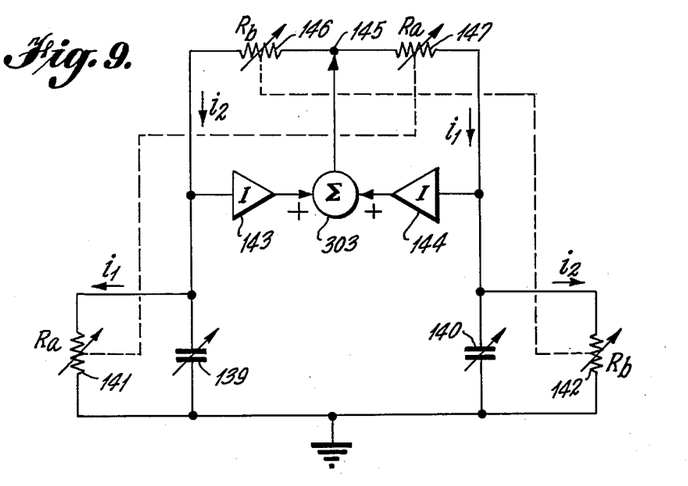
FIGURE 9 illustrates the analogue circuit for diffusion between fluid volumes which is to be used when the forward and backward diffusion rate constants differ.

(4)

in which $m_a$ and $m_b$ are the masses in volumes $v_a$ and $v_b$ respectively, $c_a$ and $c_b$ are the concentrations of the masses in volumes $v_a$ and $v_b$ respectively, $k_{ab}$ is the transfer rate constant from volume $v_a$ to $v_b$, $k_{ba}$ is the reverse rate constant, $\rho_{ab}$ equals $k_{ab}v_a$, and $\rho_{ba}$ equals $k_{ba}v_b$. The $\rho$'s are flow rates measured in volume per unit time. Using capital letters to denote parameters in an electrical system, we may write the following equations as the electrical analogues of (1) above:

$$\frac{dQ_a}{dT} = C_a \frac{dV_a}{dT} = \frac{-V_a}{R_a} + \frac{V_b}{R_b} = -i_1 + i_2$$

$$\frac{dQ_b}{dT} = C_b \frac{dV_b}{dT} = \frac{V_a}{R_a} - \frac{V_b}{V_b} = i_1 - i_2$$

(5)

in which $C_a$ and $C_b$ are capacitors, $Q_a$ and $Q_b$ are the charges on capacitors $C_a$ and $C_b$ respectively, $V_a$ and $V_b$ are the voltages across capacitors $C_a$ and $C_b$ respectively, $R_a$ is the impedance to the current $i_1$, and $R_b$ is the impedance to the current $i_2$, and $i_1$ and $i_2$ are the currents flowing in the circuit, as indicated in FIGURE 9.

The circuit shown in FIGURE 9 realizes the equations above wherein the capacitances of capacitors 139 and 140 are respectively $C_a$ and $C_b$, the voltages $V_a$ and $B_b$ are respectively the voltages across the capacitors 139 and 140, the resistors 141 and 147 both have the resistance of $R_a$, the resistors 146 and 142 both have the resistance of $R_b$, the current $i_1$ flows through the resistors 147 and 141 in the directions indicated by the arrow, and the current $i_2$ flows through resistors 146 and 142 in the direction indicated by the arrows. Each of the capacitors 139 and 140 is shunted respectively by resistors 142 and 142. Each capacitor 139 and 140 is respectively connected to isolation amplifiers 143 and 144. The amplifiers 143 and 144 have a unity gain, and their output voltages are added in an accurate non-inverting feedback-type adder 303. The sum of the voltage on capacitor 139 and the voltage on the capacitor 140 appears at terminal 145 as the output of the adder 302. The terminal 145 is connected to the two capacitors 139 and 140 through the resistors 146 and 147. The resistor 147 and the resistor 141 have the same resistance $R_a$, and the resistor 146 and the resistor 142 have equal resistances $R_b$. Since these resistors have to be varied in order to produce a curve which is equal to the curve obtained experimentally, the resistance 141 is ganged with resistance 147 to be varied together with it, and the resistance 146 is likewise ganged with resistance 142.

When only flow from volume $a$ to volume $b$ is present, $k_{ba} = 0$, and the resistance $R_b$ of the resistors 146 and 142 equals infinity. Under these conditions, any initial charge on capacitor 139 will be transferred to capacitor 140, and the final equilibrium state will be that with the voltage $V_a$ across capacitor 139 equal to zero. Physically, this situation will occur when a wall separating the two volumes allows passage of tracer in the $a$—$b$ direction through the wall, but not in the $b$—$a$ direction. This circumstance might arise if the tracer molecules were immediately sequestered by a metabolic chemical reaction upon their entrance into volume $b$. If the reaction rate were not infinite, some molecules could diffuse in the reverse direction after entering $b$; if such reverse diffusion were large enough to be of importance, a more complicated analogue would be required which might, for example, utilize time-varying diffusion rates (and resistors). Note that the circuit of FIGURE 9, with resistance $R_b$ of the resistors 146 and 142 equal to infinity, could be used to sum the charge (or tracer) flowing into the urine, and the voltage $V_b$ across capacitor 140 compared on the machine with an experimental curve of tracer mass in the urine obtained during the course of an experiment.

When neither $k_{ab}$ nor $k_{ba}$ are zero, final equilibrium is attained when $i_1=i_2$. Thus, the loss of charge by the current flow through resistors 141 and 142 to ground is continuously supplied from the output of the adder 303. For such dynamic equilibrium to be maintained over lengthy periods, it is necessary that the adder output be very accurately equal to $(V_a+V_b)$, and that the resistances of resistors 141 and 147 and the resistances of the resistors 146 and 142 be accurately equal. However, if the circuit of FIGURE 9 is used in a cycled analogue, equilibrium will usually not be attained during a cycle or at any rate need not be long maintained, and the above degree of accuracy will be unnecessary. The circuit shown in FIGURE 9 should be used to interconnect any two capacitors in the circuit when the diffusion rate constants are not equal in both directions between the fluid volumes represented by those capacitors. The interconnection between two capacitors which represent two fluid volumes between which the forward and back diffusion rates are equal can be left simply a resistor. As a result, the actual analogue circuit used in the instrument may utilize both simple resistors as the interconnection between some pairs of capacitors and circuits like that shown in FIGURE 9 as the interconnection between other pairs of capacitors.

The solutions of Equations 5 for $V_a(0) \neq 0$ and $V_b(0)=0$ are readily found to be:

$$V_a(T) = V_a(0) \frac{\frac{R_a C_a}{R_b C_b} + e^{-(1/R_a C_a + 1/R_b C_b)T}}{\frac{R_a C_a}{R_b C_b} + 1}$$

$$V_b(T) = \frac{C_a}{C_b} V_a(0) \frac{1 - e^{-(1/R_a C_a + 1/R_b C_b)T}}{\frac{R_a C_a}{R_b C_b} + 1}$$

(6)

Since $1/R_a$ determines the forward transfer of charge from $C_a$ to $C_b$ and $1/R_b$ the reverse transfer, it can be seen that when $1/R_b=0$, the charge initially on $C_a$ is finally completely transferred to $C_b$. The time variations in this case reduce to:

$$V_a(T) = V_a(0) e^{-T/R_a C_a}$$

$$V_b(T) = \frac{C_a}{C_b} V_a(0) [1 - e^{-T/R_a C_a}]$$

(7)

It follows from these results, or from Equation 5 that:

$$V_b(T) = \frac{1}{R_a C_b} \int_0^T V_a(\tau) d\tau$$

Figure 10:
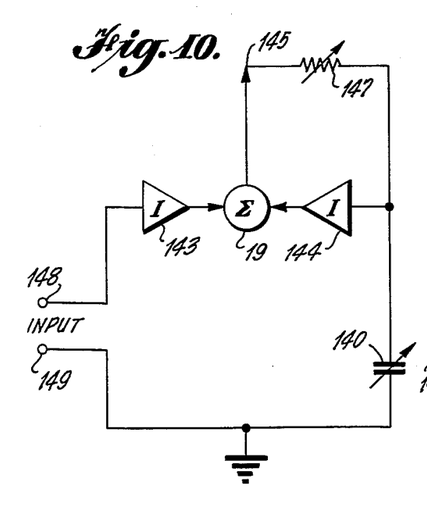
FIGURE 10 illustrates how the circuit of FIGURE 9 may be used to integrate a time-varying voltage.

Thus, the circuit of FIGURE 9 can be used to integrate a voltage, if $1/R_b$ is made to equal zero. This is accomplished by removing resistors 142 and 146 from the circuit. The voltage to be integrated does not have to be restricted to the integration of a voltage across a capacitor discharging through a resistor. Therefore, the capacitor 139 and the resistor 141 should also be eliminated. After the elimination of these components, the resulting circuit which is obtained is shown in FIGURE 10. The voltage to be integrated should be applied between terminals 148 and 149 in the circuit shown in FIGURE 10.

The resulting voltage produced across the capacitor 140 will be proportional to the time integral of a voltage applied between terminals 148 and 149. The scale of the resulting voltage output can be varied by changing the value of the capacitor 140 or the resistor 147.

Figure 11:
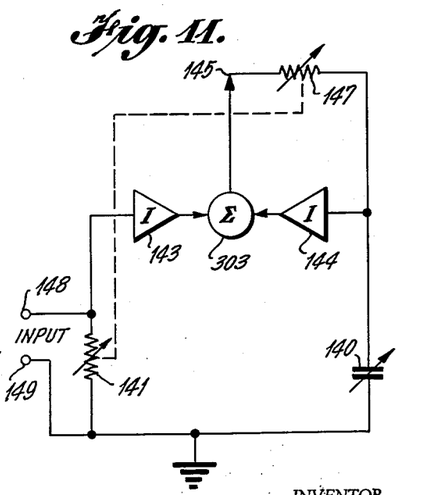
FIGURE 11 illustrates how the circuit of FIGURE 9 may be used to integrate current which may flow through a resistor which varies with time or current.

Since $V_a(T)=i_1(T)R_a$, $V_b(T)$ in Equation 7 is also proportional to the integral of $i_1(T)$, the current through $R_a$. Thus, the circuit of FIGURE 9 may be also used to integrate current. The circuit can be used to integrate current even if the resistance $R_a$ is nonlinear and time-variable. Thus, $i_1$ may arise from any source of current, such as an ion chamber. In the case of current integration with nonlinear and time-variable $R_a$, the Equation 7 becomes:

$$V_b(T) = \frac{1}{C_b} \int_0^T i_1(\tau) d\tau = \frac{1}{C_b} \int_0^T \frac{TV_a(\tau)}{R_a(\tau)} d\tau \quad (8)$$

in which $R_a$ has been written as $R_a(\tau)$ to indicate possible dependence of $R_a$ on time or current through $R_a$. To use the circuit of FIGURE 9 to integrate current, $1/R_b$ must be made equal to zero, so the resistors 142 and 146 must be removed. Also, the capacitor 139 is not necessary, since the current to be integrated may arise from any source. Therefore, the capacitor 139 also should be removed. The resulting circuit for current integration is shown in FIGURE 11. The current to be integrated must flow through the resistor 141, which must have a resistance equal to that of resistor 147. When the current integration is performed with the resistance $R_a$ nonlinear or time-varying, both the resistors 141 and 147 must be made to vary with time or current in exactly the same way, so that the resistors 141 and 147 are always equal.

Proper operation of the circuits of FIGURES 9, 10, and 11 depend on several factors. First, the minimum input impedance of the isolation amplifiers must be as high as possible. Second, the two $R_a$ resistors 141 and 147 must be made as equal as practical, as must the $R_b$ resistors 142 and 146. Finally, the voltage transfer ratio from either isolation amplifier input to the adder output must be exactly unity. If it is greater than unity, the circuit is regenerative, and the total amount of charge in the system is not time-independent, but will increase. In order to make the resistors as equal as possible, it is desirable that they be ganged decades, each pair covering the range from 9.99 megohms to 9.99 kilohms. Corresponding resistors of a pair were selected to differ only by a small fraction of a percent.

Figure 12:
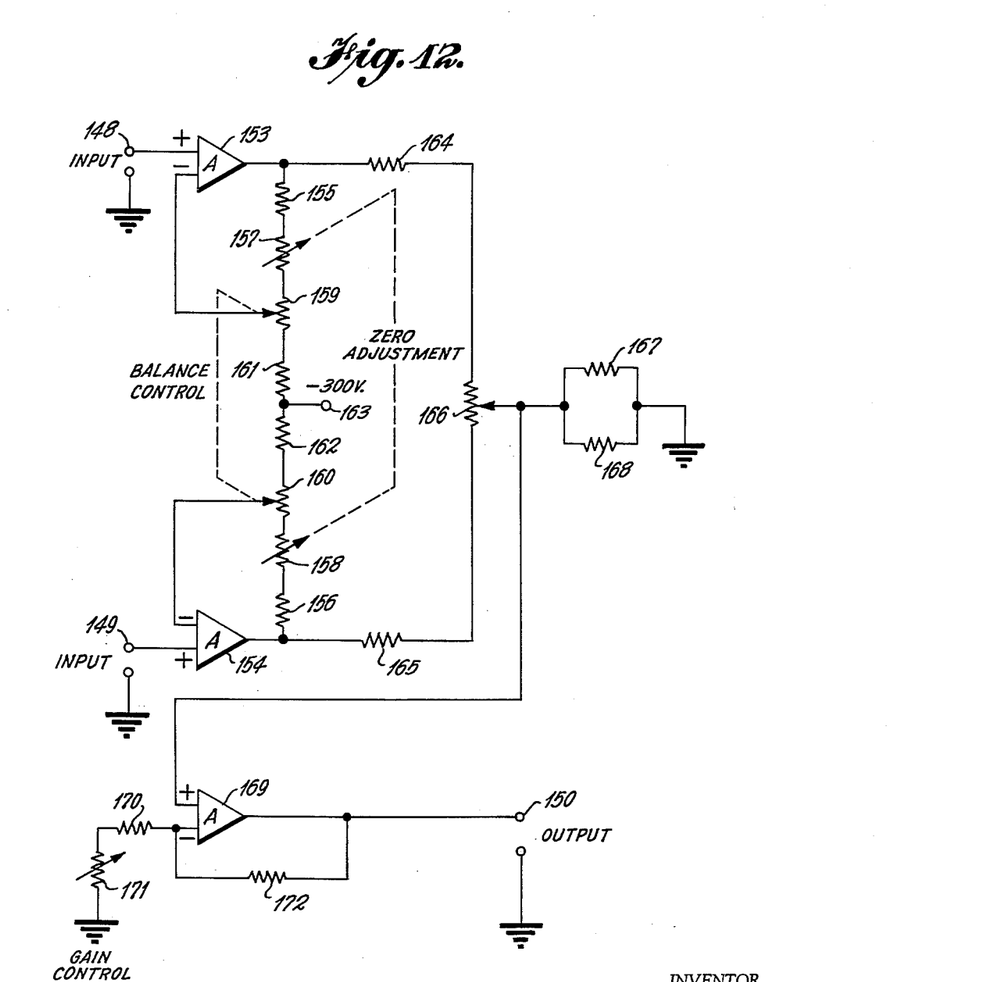
FIGURE 12 illustrates a sophisticated way of achieving the circuit of FIGURE 9.

In FIGURE 12, it is shown how the heart of the circuit, the isolation amplifiers and the adder, has been realized using operational amplifiers. The inputs to the isolation amplifiers 143 and 144 of FIGURES 9, 10, and 11 correspond to the terminals 148 and 149 in FIGURE 13, and the output of the adder 303 corresponds to terminal 150. The operational amplifiers may be Philbrick Model K2–W's which have an open loop voltage gain of 15,000, a minimum input impedance approaching $10^3$ megohms, a dynamic range of $\pm 50$ volts, and a rise time of 2 microseconds. The operational amplifiers are designated 153 and 154 in FIGURE 12. The terminal 148 is connected to the plus side of the input of amplifier 153, and the terminal 149 is connected to the plus side of the input of the amplifier 154. The output of each of the amplifiers 153 and 154 are connected to a minus 300 volts applied at a terminal 163 through voltage divider networks. The voltage divider networks are identical, and comprise (going from the amplifier outputs to the terminal 163) 11 kilohm resistors 155 and 156, 2 kilohm variable resistors 157 and 158, 1 kilohm potentiometers 159 and 160, and megohm resistors 161 and 162. The resistors 157 and 158 are ganged so that they are always equal. The variable tap on the potentiometer 159 is applied to the minus side of the input of amplifier 153, and the variable tap of potentiometer 160 is applied to the minus side of the input of amplifier 154. The taps of potentiometers 159 and 160 are ganged so that when the taps are moved in one direction, the potential applied to the minus input of amplifier 153 will increase, and the potential applied to the minus input of amplifier 154 will decrease and when the taps are moved in the opposite direction, the potential applied to the minus input of amplifier 153 will decrease, and that applied to the minus input of amplifier 154 will increase. A 500 ohm potentiometer 166 has one of its end terminals connected to the output of amplifier 153 through a 100 kilohm resistor 164, and the other of its end terminals connected through a 100 kilohm resistor 165 to the output of amplifier 154. The tap of the potentiometer 166 is connected to ground through a parallel circuit of a megohm resistor 167 and a 100 kilohm resistor 168. The tap of the potentiometer 166 is connected to the plus side of the input of amplifier 169. The minus side of the input of amplifier 169 is connected to ground through a 91 kilohm resistor 170 and a 20 kilohm variable resistor 171. The output of amplifier 169 is fed back to the minus side of the input of the amplifier through a 200 kilohm resistor 172. The output of amplifier 169 is applied to the output terminal 150. The amplifier 169, like the amplifiers 153 and 154, may be a Philbrick Model K2–W, or other suitable amplifier.

The connection from the taps of potentiometers 159 and 160 to the inputs of the amplifiers 153 and 154 comprises a negative feedback D.-C. offset for these amplifiers, and causes these amplifiers to function as voltage followers. The voltages produced at the outputs of the amplifiers 153 and 154 are added together over the parallel circuit of resistors 167 and 168. The resulting sum voltage appearing at the tap of the potentiometer 166 is amplified by amplifier 169, and applied to output terminal 150.

For the operation of the circuit, it is necessary for a voltage applied at either of the inputs, which comprise the terminals 148 and 149, to appear at the output, which comprises terminal 150, with no change of D.-C. level. The D.-C. offset provided by the connection from the potentiometers 159 and 160 effect this condition of no change in D.-C. level. The ganged variable resistors 157 and 158 provide an adjustment so that the change in D.-C. level can be made precisely zero. The adjustment provided by the ganged potentiometers 159 and 160 enables the D.-C. offset for each of the amplifiers 153 and 154 to be precisely balanced. The adjustment provided by the potentiometer 166 allows the resistances from the outputs of the amplifiers 153 and 154 to the tap of the potentiometer 166 to be made exactly equal. The attenuation of the voltage produced at the tap of the potentiometer 166 caused by the addition circuit is made up by the gain of amplifier 169. The variable resistor 171 provides gain adjustment for the amplifier 169 so that the voltage transfer ratio from either input at terminal 148 or 149 to the output at terminal 150 may be made to equal exactly unity. By cancelling the D.-C. offset of the amplifier 169 at the amplifiers 153 and 154, interaction between the zero adjustment and the gain control is greatly reduced compared to the interaction resulting from offset cancellation at the amplifier 169 itself.

After final adjustment, a voltage applied to either input, with the other input at ground, causes an output to be produced well within 0.01% of the voltage applied at the input. With nonzero voltage applied to both inputs, their sum appears at the output with the same high degree of linearity.

If the voltage transfer ratio of the circuit of FIGURE 12 is made slightly greater than unity so that the circuit of FIGURE 9 without loading would be slightly regenerative, the very small loading of the voltage follower circuits can be effectively cancelled so that neither regeneration nor over-all loss of charge occurs. This condition can be maintained to a high degree of accuracy for many minutes.

Figure 13:
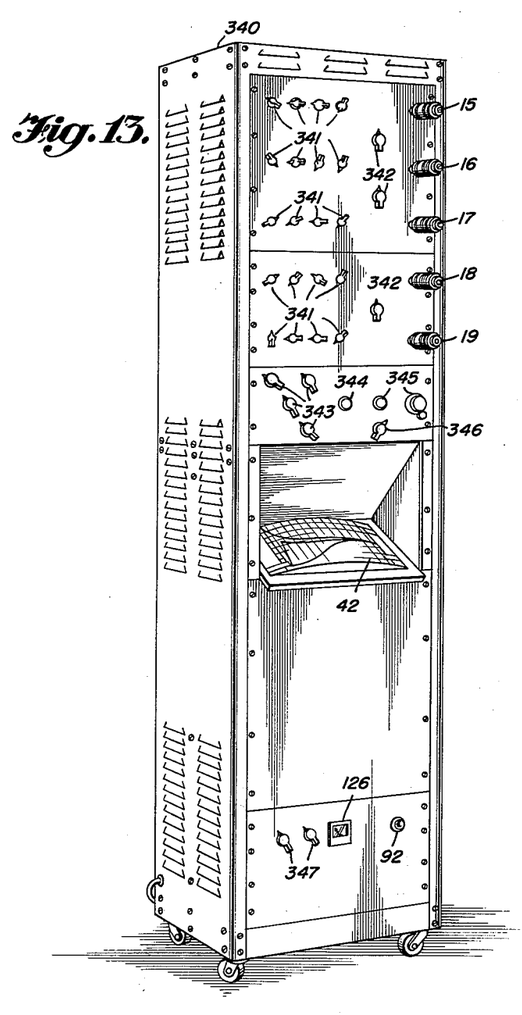
FIGURE 13 illustrates an external view of the apparatus showing the casing, the control knobs, and the graph paper on which experimental curves are plotted.

The external casing with the controls is shown in FIGURE 13. The apparatus is enclosed in the casing 340. Mounted on the front wall of the casing are the control knobs for the apparatus. The 5 rows of knobs 341 vary the capacitances of capacitors 10 through 14 (FIGURES 2A through 2D and 6), each row controlling a capacitor. The five plug-in resistors 15 through 19 are shown mounted in a column on the upper right-hand front wall of the casing. The knobs 342 control the analogue circuit switches 20, 21, and 21a (FIGURES 2A and 6). The knobs 343 control the circuit switches 80, 81, 84, and 87 (FIGURE 6). The knob 344 controls the charging voltage 23 (FIGURES 3 and 6) by means of the variable resistor 137 (FIGURE 8). The knobs 345 control the galvanometer sensitivity and damping resistors 62 and 63 (FIGURE 5). The knob 346 controls the galvanometer sensitivity shorting switch 71 (FIGURE 5). The knobs 347 control the power switches 90 and 100 (FIGURE 7), and are mounted next to the ammeter 126 and the pilot light 92.

The graph paper 42 is supported so as to be inset within the instrument to reduce the incident light level. For operation under very high ambient light level conditions, an additional metal screen swings out from the machine to shield the graph region even further.

Some other possible applications of the machine are in the fields of chemical process studies, semiconductors, and geophysics. The diffusion process is a very general one and appears in many different situations. In semiconductors, it is sometimes found that several lifetimes or recombination times are important and that, therefore, an injected pulse of current decays with a curve made up of several exponential terms with different decay constants. The present machine might be adapted to analyze such decay to yield values of such time constants, as well as trap and recombination center densities. Finally, the machine might be applicable to the study of oil-field dynamics in geophysics. If a known amount of some kind of tracer material were injected into one pool of a field consisting of several pools separated by less porous material, analysis of concentration decay curves measured after injection might allow both the pool volumes and the diffusion rate constants between pools of the system to be evaluated. The latter might be correlated in a useful way with the character of the material separating the pools and its thickness.

The machine which has been disclosed was designed to handle transient diffusion problems. It could be easily augmented to handle more than five volumes if the data to be analyzed warranted. Further, a useful modification would employ mechanical gearing to change the actual sweep time and make available say times of 0.4, 1.0, 3.0, and 10 seconds. This would make it more convenient to analyze experimental curves plotted to different time scales than the present method of changing all the RC time constants when passing from one $\epsilon$ scale-factor to another. Finally, flow of tracer material from any volume to ground (out of the system of interest) may be handled by connecting a resistor between the corresponding capacitor and ground, as is done in the present machine for the flow from the blood through the kidneys and out with the urine.

These and other modifications are considered to come within the scope of this invention, which is to be limited only as defined in the appended claims.

What is claimed is:

1. An analogue circuit comprising a first capacitor, a second capacitor, first means to produce output voltage functionally related to the voltage on said first capacitor but isolated from said voltage on said first capacitor, second means to produce an output voltage functionally related to but isolated from the voltage on said second capacitor, third means to produce an output voltage functionally related to the sum of said output voltage of said first means and said output voltage of said second means, a first impedance connecting said output voltage of third means to said first capacitor, a second impedance connecting said output voltage of said third means to said second capacitor, a third impedance shunting said first capacitor, and a fourth impedance shunting said second capacitor.

2. An analogue circuit as recited in claim 1 wherein said first impedance equals said fourth impedance and said second impedance equals said third impedance.

3. An analogue circuit as recited in claim 1 wherein said first, second, third, and fourth impedances respectively comprise first, second, third, and fourth variable resistors.

4. An analogue circuit as recited in claim 3 wherein said first resistor is ganged with said fourth resistor so as to be always equal in resistance to the resistance of said fourth resistor and said second resistor is ganged with said third resistor so as to be always equal in resistance to the resistance of said third resistor.

5. An analogue circuit comprising a first capacitor, a second capacitor, means having inputs connected separately across said first and second capacitors and adapted to produce an output voltage which is substantially equal to the sum of the voltage on said first capacitor and the voltage on said second capacitor, a first impedance connecting said output voltage of said means across said first capacitor, a second impedance connecting said output voltage of said means to said second capacitor, a third impedance shunting said first capacitor, and a fourth impedance shunting said second capacitor.

6. An integrating circuit comprising a first impedance, a capacitor, means having inputs connected separately across said first impedance and said capacitor and adapted to produce an output voltage which is substantially equal to the sum of the voltage across said first impedance and the voltage across said capacitor, a second impedance connecting the output of said means across said capacitor, said second impedance having a value equal to that of said first impedance.

7. An integrating circuit comprising an input, a capacitor, means having input terminals connected separately across said capacitor and across said input and adapted to produce an output voltage which is substantially equal to the sum of the voltages applied across said input and across said capacitor, and an impedance connecting the output of said means across said capacitor.

8. An integrating circuit comprising a first impedance, a first means to produce a voltage which is a function of the total charge received by said first means, second means having inputs connected separately across said first impedance and across said first means and adapted to produce an output voltage which is substantially equal to the sum of the voltage across said first impedance and the voltage produced by said first means, and a second impedance connecting the output of said second means to said first means, said second impedance having a value equal to that of said first impedance.

9. An integrating circuit comprising an input, first means to produce a voltage as a functon of the total charge received by said first means, second means having input terminals connected separately across said input and across said first means and adapted to produce an output voltage which is substantially equal to the sum of the voltage produced by said first means and the voltage applied to said input, and an impedance connecting the output of said second means to said first means.

10. A circuit for producing the sum of two input voltages comprising a first amplifier connected with a D.-C. offset to comprise a voltage follower, a second amplifier connected with a D.-C. offset to comprise a second voltage follower, means for combining the output voltages of said first and second voltage followers as a sum of these voltages, means to simultaneously adjust the D.-C. offset for said first and second voltage followers in the same directions, and means to simultaneously adjust the D.-C. offset for said first and second voltage followers in opposite directions.

11. Apparatus for analyzing diffusion problems comprising a pair of capacitors, separate discharge paths for each of said capacitors, means to cyclically charge one of said capacitors, means to produce a visual curve corresponding to the voltage on the other of said capacitors as a function of time, means having inputs connected separately to each of said capacitors and adapted to produce an output voltage equal to the sum of the individual voltages across said capacitors, and means substantially equivalent to said separate discharge paths for separately connecting said output voltage to each of said capacitors.

12. An analogue circuit comprising a first capacitor, a second capacitor, means having inputs connected separately across each of said first and second capacitors and adapted to produce an output voltage which is substantially equal to the sum of the voltage across said first capacitor plus the voltage across said second capacitor, first impedance means connecting said output voltage across said second capacitor whereby said second capacitor will be charged by said output voltage independently of said first capacitor, and second impedance means shunting said first capacitor.

References Cited in the file of this patent

UNITED STATES PATENTS 2,855,145     Patterson _______________ Oct. 7, 1958

OTHER REFERENCES

"An Electrical Analog for Analysis of Compartmental Biological Systems" (Brownell et al.), The Review of Scientific Instruments, vol. 24, No. 8, August 1953, pp. 704–710.

"A Curve Analizer and General Purpose Graphical Computer" (French et al.), The Review of Scientific Instruments, August 1954, vol. 25, No. 8, pp. 771.